(12) United States Patent
Hoshino

(10) Patent No.: US 12,349,181 B2
(45) Date of Patent: Jul. 1, 2025

(54) VEHICLE WIRELESS COMMUNICATION DEVICE AND COMMUNICATION CONTROL METHOD

(71) Applicant: DENSO CORPORATION, Kariya (JP)

(72) Inventor: Masayuki Hoshino, Kariya (JP)

(73) Assignee: DENSO CORPORATION, Kariya (JP)

( * ) Notice: Subject to any disclaimer, the term of this patent is extended or adjusted under 35 U.S.C. 154(b) by 333 days.

(21) Appl. No.: 18/171,507

(22) Filed: Feb. 20, 2023

(65) Prior Publication Data

US 2023/0209588 A1 Jun. 29, 2023

Related U.S. Application Data

(63) Continuation of application No. PCT/JP2021/031065, filed on Aug. 25, 2021.

(30) Foreign Application Priority Data

Aug. 28, 2020 (JP) .................... 2020-144996

(51) Int. Cl.
*H04W 72/542* (2023.01)
*H04W 4/48* (2018.01)

(52) U.S. Cl.
CPC .......... *H04W 72/542* (2023.01); *H04W 4/48* (2018.02)

(58) Field of Classification Search
CPC ............... H04W 4/48; H04W 72/542
See application file for complete search history.

(56) References Cited

U.S. PATENT DOCUMENTS

| | | | |
|---|---|---|---|
| 2015/0215738 A1 | 7/2015 | Frusina et al. | |
| 2019/0223070 A1* | 7/2019 | Lu | H04W 72/542 |
| 2019/0253948 A1* | 8/2019 | Nagura | H04W 36/0088 |
| 2019/0281587 A1* | 9/2019 | Zhang | H04W 72/23 |
| 2020/0193835 A1* | 6/2020 | Kamata | G08G 1/127 |

(Continued)

FOREIGN PATENT DOCUMENTS

| | | |
|---|---|---|
| JP | 4655955 B2 | 3/2011 |
| JP | 2020095478 A | 6/2020 |

OTHER PUBLICATIONS

U.S. Appl. No. 18/171,561, filed Feb. 20, 2023, Masayuki Hoshino.
(Continued)

*Primary Examiner* — Ajay Cattungal
(74) *Attorney, Agent, or Firm* — Harness, Dickey & Pierce, P.L.C.

(57) ABSTRACT

A wireless communication device uses multiple wireless communication services for communication between an in-vehicle device of a vehicle and an external device. The wireless communication device acquires a delay characteristic value for each wireless communication service from a network device. The delay characteristic value is an upper limit of an estimated range of delay time in communication. The wireless communication device acquires an allowable delay amount indicating a length of an allowable communication delay time from the in-vehicle device. The wireless communication device allocates a wireless communication service, which is relatively small in the delay characteristic value among the wireless communication services, to the in-vehicle device that is small in the allowable delay amount.

12 Claims, 6 Drawing Sheets

(56) References Cited

U.S. PATENT DOCUMENTS

| | | | | |
|---|---|---|---|---|
| 2020/0336926 | A1* | 10/2020 | Cui | H04L 43/0858 |
| 2021/0028891 | A1* | 1/2021 | Zhou | H04W 4/40 |
| 2021/0227442 | A1* | 7/2021 | Yiu | H04W 36/00837 |
| 2021/0400537 | A1* | 12/2021 | Zhang | H04L 47/28 |
| 2022/0070876 | A1* | 3/2022 | Bangolae | H04W 76/27 |
| 2022/0095186 | A1* | 3/2022 | Zhang | H04W 36/14 |
| 2022/0159628 | A1* | 5/2022 | Bangolae | H04W 4/40 |
| 2023/0078448 | A1* | 3/2023 | Cella | G06Q 10/06311 |
| | | | | 705/7.13 |

OTHER PUBLICATIONS

U.S. Appl. No. 18/171,618, filed Feb. 20, 2023, Masayuki Hoshino.
3rd Generation Partnership Project; Technical Specification Group Services and System Aspects; Policy and charging control architecture (Release 16), 3GPP TS 23.203 VI6.2.0 (Dec. 2019), pp. 49-56.

* cited by examiner

|  | ALLOWABLE DELAY VALUE | OFFSET VALUE | OPERATIONAL VALUE |
|---|---|---|---|
| AUTOMATED DRIVING DEVICE | 100 | 0 | 100 |
| DRIVING ASSISTANCE DEVICE | 150 | -40 | 110 |
| NAVIGATION DEVICE | 500 | 0 | 500 |
| PROBE DEVICE | 2000 | 0 | 2000 |

|  | BEFORE CHANGE | AFTER CHANGE |
|---|---|---|
| AUTOMATED DRIVING DEVICE | APN_1 | APN_1 |
| DRIVING ASSISTANCE DEVICE | APN_2 | APN_1 |
| NAVIGATION DEVICE | APN_2 | APN_2 |
| PROBE DEVICE | APN_3 | APN_3 |

| | COMMUNICATED dT | dT EXCESS RATIO (%) | OFFSET VALUE | OPERATIONAL VALUE |
|---|---|---|---|---|
| APN_1 | 120 | 5 | 0 | 120 |
| APN_2 | 120 | 25 | +30 | 150 |
| APN_3 | 400 | 0 | 0 | 400 |
| APN_4 | 400 | 50 | +100 | 500 |

| DEVICE | APPLICATION | APN ALLOCATION |
|---|---|---|
| A | A-1 | APN_1 |
| A | A-2 | APN_3 |
| B | B-1 | APN_2 |
| C | C-1 | APN_3 |

VEHICLE WIRELESS COMMUNICATION DEVICE AND COMMUNICATION CONTROL METHOD

CROSS REFERENCE TO RELATED APPLICATIONS

The present application is a continuation application of International Patent Application No. PCT/JP2021/031065 filed on Aug. 25, 2021, which designated the U.S. and claims the benefit of priority from Japanese Patent Application No. 2020-144996 filed on Aug. 28, 2020. The entire disclosures of all of the above applications are incorporated herein by reference.

TECHNICAL FIELD

The present disclosure relates to a vehicle wireless communication device and a communication control method that perform communication using multiple types of communication methods.

BACKGROUND

A wireless communication device performs wireless communication using multiple types of communication methods.

SUMMARY

According to at least one embodiment of the present disclosure, a vehicle wireless communication device is used as an interface for communication between at least one in-vehicle device of a vehicle and an external device that is another communication device placed outside the vehicle. The vehicle wireless communication device is configured to use wireless communication services. The vehicle wireless communication device includes a delay characteristic acquisition unit, a delay allowable amount acquisition unit, a communication path selection unit. The delay characteristic acquisition unit is configured to acquire a delay characteristic value for each of the wireless communication services from a network device. The network device is a component of a wireless communication network. The delay characteristic value is an upper limit of an estimated range of delay time in communication. The delay allowable amount acquisition unit is configured to acquire an allowable delay amount from the at least one in-vehicle device. The allowable delay amount directly or indirectly indicates a length of an allowable delay time in communication. The communication path selection unit is configured to select a wireless communication service from among the wireless communication services for the communication between the at least one in-vehicle device and the external device based on the delay characteristic value of each of the wireless communication services and the allowable delay amount of the at least one in-vehicle device. The communication path selection unit is configured to allocate a wireless communication service, which is relatively small in the delay characteristic value among the wireless communication services, to an in-vehicle device that is relatively small in the allowable delay amount among the at least one in-vehicle device.

According to at least one embodiment of the present disclosure, a communication control method is used for control of communication between at least one in-vehicle device of a vehicle and an external device that is a communication device placed outside the vehicle. The communication control method uses wireless communication services in parallel. The external device is another communication device provided outside a vehicle. The communication control method is executed by at least one processor. In the communication control method, the following are performed. A delay characteristic value is acquired for each of the wireless communication services from a network device. The network device is a component of a wireless communication network. The delay characteristic value is an upper limit of an estimated range of delay time in communication. An allowable delay amount is acquired from the at least one in-vehicle device. The allowable delay amount directly or indirectly indicates a length of an allowable delay time in communication. A wireless communication service is selected from among the wireless communication services for the communication between the at least one in-vehicle device and the external device based on the delay characteristic value of each of the wireless communication services and the allowable delay amount of the at least one in-vehicle device. In the selecting of the communication path, a wireless communication service, which is relatively small in the delay characteristic value among the wireless communication services, is allocated to an in-vehicle device that is relatively small in the allowable delay amount among the at least one in-vehicle device.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
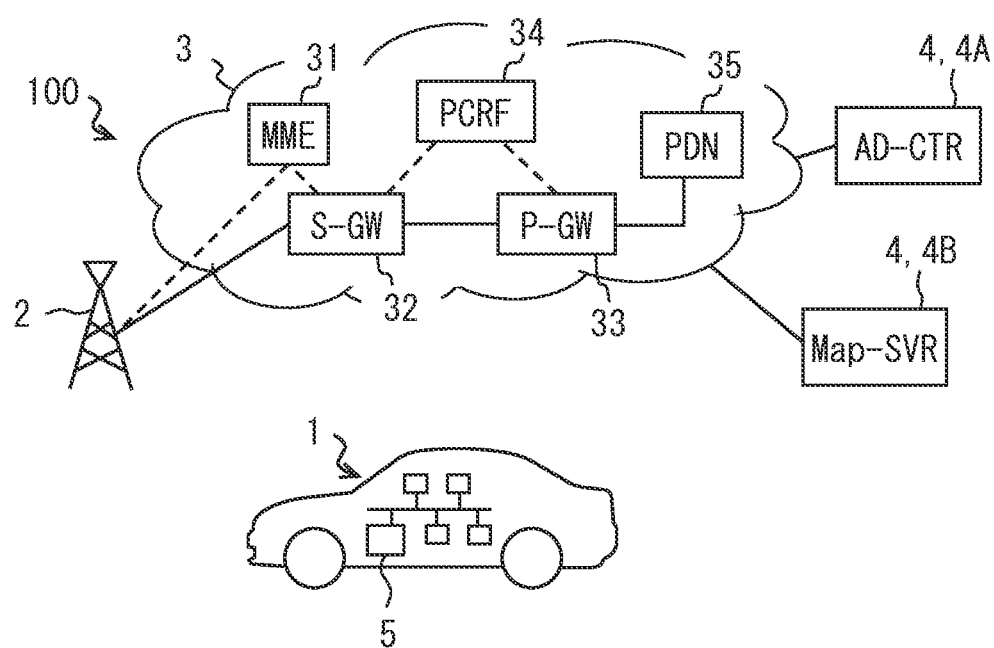
FIG. 1 is a diagram for illustrating an overall image of a mobile communication system.

To begin with, examples of relevant techniques will be described. According to a comparative example, a vehicle wireless communication device and a communication control method perform communication using multiple types of communication methods in parallel.

In the vehicle wireless communication device, a communication performance of each communication method is scored based on multiple types of indices indicating a radio wave environment, and a communication method used for data communication is selected based on scores of the communication methods. Specifically, the communication performance of each communication method is scored based on a number of multipaths, a degree of interference, an amount of Doppler shift, and an estimation value of an effective throughput. The communication method with the highest score is selected.

The communication methods assumed in the comparative example are, for example, FSK, CDMA, OFDM, QPSK, and the like. FSK is an abbreviation for Frequency shift keying. COMA is an abbreviation for Code Division Multiple Access. OFDM is an abbreviation for Orthogonal Frequency Division Multiplexing. QPSK is an abbreviation for Quadrature Phase Shift Keying.

In addition, 3GPP has proposed a method of optimizing network processing according to usage characteristics of mobile communication terminals.

In the configuration of the comparative example, only the number of multipaths, the degree of interference, the amount of Doppler shift, and the estimated value of the effective throughput are assumed as parameters for selecting a communication service from multiple communication services for usage in communication. If a communication service is selected based on indices other than the above, it may be possible to further reduce a risk that a delay in communication between an in-vehicle device and an external device exceeds a predetermined allowable range.

According to the present disclosure, a vehicle wireless communication device and a communication control method that are capable of reducing a risk of communication delay time exceeding a predetermined allowable range can be provided.

According to an aspect of the present disclosure, a vehicle wireless communication device is used as an interface for communication between at least one in-vehicle device of a vehicle and an external device that is another communication device placed outside the vehicle. The vehicle wireless communication device is configured to use wireless communication services. The vehicle wireless communication device includes a delay characteristic acquisition unit, a delay allowable amount acquisition unit, a communication path selection unit. The delay characteristic acquisition unit is configured to acquire a delay characteristic value for each of the wireless communication services from a network device. The network device is a component of a wireless communication network. The delay characteristic value is an upper limit of an estimated range of delay time in communication. The delay allowable amount acquisition unit is configured to acquire an allowable delay amount from the at least one in-vehicle device. The allowable delay amount directly or indirectly indicates a length of an allowable delay time in communication. The communication path selection unit is configured to select a wireless communication service from among the wireless communication services for the communication between the at least one in-vehicle device and the external device based on the delay characteristic value of each of the wireless communication services and the allowable delay amount of the at least one in-vehicle device. The communication path selection unit is configured to allocate a wireless communication service, which is relatively small in the delay characteristic value among the wireless communication services, to an in-vehicle device that is relatively small in the allowable delay amount among the at least one in-vehicle device.

The delay characteristic value represents an estimated value of the communication delay time in the network device. Thus, the wireless communication service which is relatively small in the delay characteristic value corresponds to a wireless communication service that is relatively high in communication speed. Therefore, by allocation of the wireless communication service which is relatively small in the delay characteristic value to the in-vehicle device that is relatively small in the allowable delay amount, it is possible to reduce a risk that an actual delay time falls outside the allowable range of the delay time required by the in-vehicle device.

According to another aspect of the present disclosure, a communication control method is used for control of communication between at least one in-vehicle device of a vehicle and an external device that is a communication device placed outside the vehicle. The communication control method uses wireless communication services in parallel. The external device is another communication device provided outside a vehicle. The communication control method is executed by at least one processor. In the communication control method, the following are performed. A delay characteristic value is acquired for each of the wireless communication services from a network device. The network device is a component of a wireless communication network. The delay characteristic value is an upper limit of an estimated range of delay time in communication. An allowable delay amount is acquired from the at least one in-vehicle device. The allowable delay amount directly or indirectly indicates a length of an allowable delay time in communication. A wireless communication service is selected from among the wireless communication services for the communication between the at least one in-vehicle device and the external device based on the delay characteristic value of each of the wireless communication services and the allowable delay amount of the at least one in-vehicle device. In the selecting of the communication path, a wireless communication service, which is relatively small in the delay characteristic value among the wireless communication services, is allocated to an in-vehicle device that is relatively small in the allowable delay amount among the at least one in-vehicle device.

According to the above method, effects similar to those of the vehicle wireless communication device can be achieved by an operation principle similar to that of the vehicle wireless communication device.

Hereinafter, an embodiment of the present disclosure will be described with reference to the drawings. FIG. 1 is a diagram illustrating an example of a schematic configuration of a mobile communication system 100 according to the present disclosure. The mobile communication system 100 provides wireless communication conforming to, for example, Long Term Evolution (LTE). Parts omitted in the following description are assumed to be performed by a method defined by the LTE standard (e.g., 3GPP TS 36.314 V15.1.0 (2018-07) 3rd Generation Partnership Project, "Evolved Universal Terrestrial Radio Access (E-UTRA); Layer 2—Measurements"). The mobile communication system 100 may provide wireless communication conforming to the 4G standard, the 5G standard, or the like. The embodiment described below may be implemented by appropriately modifying the embodiment to conform to the 4G standard, the 5G standard, or the like.

As illustrated in FIG. 1, the mobile communication system 100 includes an in-vehicle communication system 1, a wireless base station 2, a core network 3, an automated driving management center 4A, and a map server 4B. Each of the automated driving management center 4A and the map server 4B corresponds to an example of an external device 4 for the in-vehicle communication system 1. Each of the external devices 4 refers to another communication device provided outside a vehicle.

The in-vehicle communication system 1 is a communication system built in a vehicle. The in-vehicle communication system 1 can be mounted on various vehicles each of which can travel on a road, such as a two-wheeled vehicle or a three-wheeled vehicle, in addition to a four-wheeled vehicle. A motorized bicycle can also be included in the two-wheeled vehicle. A vehicle to which the system is applied (hereinafter, also referred to as a system-mounting vehicle) may be an owner car owned by an individual person, or may be a vehicle provided for a car sharing service or a vehicle lending service. The system-mounting vehicle may be a service car. Examples of the service car include a taxi, a fixed-route bus, and a shared bus. The service car may also be a robot taxi, an unmanned operation bus, or the like that is operated without a driver. As another example of the service car, a vehicle serving as an automated delivery robot, which automatically delivers a package to a predetermined destination, that is, a vehicle serving as an unmanned delivery robot, can be also included. The system-mounting vehicle may further be a remotely operated vehicle, which is remotely operated by an operator present outside the vehicle. Here, the operator refers to a person or a computer having authority to control the vehicle from the outside of the vehicle with remote operation.

The in-vehicle communication system 1 performs data communication with each external device 4 such as the automated driving management center 4A via the wireless base station 2 and the core network 3. The in-vehicle communication system 1 includes a wireless communication device 5 as a configuration that provides a wireless communication function. The wireless communication device 5 corresponds to a user equipment (so-called UE) for the core network 3. The wireless communication device 5 may be configured to be detachable by a user. The wireless communication device 5 may be a mobile terminal such as a smartphone carried in the vehicle compartment by a user. The wireless communication device 5 corresponds to a vehicle wireless communication device.

The wireless communication device 5 is configured to be capable of using a plurality of wireless communication services with respective different Access Point Names (APNs). The wireless communication device 5 performs data communication with each external device 4 by selectively using the plurality of wireless communication services in accordance with a use or the like. An APN is an identifier for a communication service in one aspect. An APN is associated with a telecommunications carrier (so-called carrier), which provides a communication service. When different APNs are allocated, substantively different, or virtually or logically different paths are used for flowing data to a single external device 4, even if the communication target is the same single external device 4. That is, the wireless communication device 5 is configured to be capable of performing data communication with the external device 4 by using multiple types of wireless communication paths corresponding to respective APNs. The in-vehicle communication system 1 including the wireless communication device 5 will be described later.

The wireless base station 2 is equipment that transmits and receives wireless signals to and from the in-vehicle communication system 1. The wireless base station 2 is also referred to as an evolved NodeB (eNB). The wireless base station 2 may be a next generation NodeB (gNB) used in the 5G scheme. The wireless base station 2 is arranged for each predetermined cell. The wireless base station 2 is connected to the core network 3 via an access line such as an Internet Protocol (IP) network. The wireless base station 2 relays traffic between the wireless communication device 5 and the core network 3. The wireless base station 2, for example, allocates a transmission opportunity based on a request from the in-vehicle communication system 1. The transmission opportunity includes a frequency band, a time, a modulation scheme, and the like that can be used for data transmission.

The core network 3 is a so-called Evolved Packet Core (EPC). The core network 3 provides functions such as user authentication, contract analysis, setting of a forwarding path of a data packet, and control of Quality of Service (QoS). The core network 3 may include a public communication network provided by a telecommunications company that operates, for example, an IP network or a mobile-phone network. The core network 3 corresponds to a wireless communication network.

The core network 3 includes, for example, an MME 31, an S-GW 32, a P-GW 33, and a PCRF 34. The MME of the MME 31 stands for the Mobility Management Entity. The MME 31 is in charge of managing UEs in the cell and controlling the wireless base station 2. The MME 31 serves as, for example, a gateway for control signals between the wireless base station 2 and the S-GW 32. The S-GW of the S-GW 32 stands for the Serving Gateway. The S-GW 32 is a configuration corresponding to a gateway for data from UEs. The P-GW of the P-GW 33 stands for the Packet Data Network Gateway. The P-GW 33 corresponds to a gateway for connecting to a Packet Data Network (PDN) 35 such as the Internet. The P-GW 33 performs allocation of an IP address, packet forwarding to the S-GW, and the like.

The PCRF of the PCRF 34 stands for the Policy and Charging Rules Function. The PCRF 34 is a logical node that performs control for a QoS and charging related to forwarding of user data. The PCRF 34 includes a database having network policies and charging rules. The PCRF 34 determines a delay characteristic value (delayThreshold, hereinafter also denoted by dT), which is one parameter used for communication control performed when communication connection is established with the wireless communication device 5 serving as a UE. The delay characteristic value determined by the PCRF 34 is communicated to the wireless communication device 5 via, for example, at least one of the MME 31 and the wireless base station 2.

The delay characteristic value here is a parameter for the UE to verify whether transmission delay of the communication packet occurs to an unexpected extent, that is, whether a QoS is secured from the viewpoint of communication delay. In one aspect, the delay characteristic value corresponds to an upper limit value within an estimated range of a delay time in transmission of a communication packet. A larger delay characteristic value means a longer estimated communication delay time. A communication path with a smaller delay characteristic value is a communication path with a smaller allowable delay amount, that is, a highly real-time communication path. The communication path here can be replaced with an APN in the implementation. An example has been illustrated in which the PCRF 34 determines a delay characteristic value, and the delay characteristic value is communicated to the wireless communication device 5. However, the entity that determines the delay characteristic value is not limited to the PCRF 34. The wireless base station 2 may determine the delay characteristic value in accordance with information received from the core network 3.

When communication connection is established, each UE including the wireless communication device 5 calculates a dT excess ratio, periodically or at the time of detecting a predetermined trigger. Then, each UE transmits a UL-PDCP delay report, which is a data set indicating the dT excess ratio, to a network device, which manages the delay characteristic value. The network device here includes the MME 31, the PCRF 34, or the wireless base station 2, as described later. The UL-PDCP delay report corresponds to so-called UL PDCP Packet Delay. The dT excess ratio is a ratio of sections in which a transmission delay time in transmission of the communication packet exceeds the delay characteristic value within a predetermined time period. The dT excess ratio directly or indirectly indicates an actual performance value of a communication speed in the UL-PDCP. That is, the dT excess ratio is a parameter that directly or indirectly indicates frequency of occurrence of a situation in which a delay time exceeds an estimated value of the delay time. The "UL" of the UL-PDCP refers to the uplink, and the "PDCP" refers to a protocol that performs encryption, validity check, reordering, header compression, and the like, in one of sublayers forming the layer 2.

The arithmetic processing such as the calculation of the dT excess ratio in the wireless communication device 5 may be executed periodically, or may be executed with a trigger, which is the reception of an inquiry from a network device. That is, the internal arithmetic processing in the wireless communication device 5 such as the calculation of the dT excess ratio may be executed with a trigger, which is the occurrence of a predetermined event. The transmission of a UL-PDCP delay report and the like may also be performed periodically, or may be performed with a trigger, which is the reception of an inquiry from a network device.

When the wireless base station 2 or the core network 3 receives a UL-PDCP delay report from the wireless communication device 5, the wireless base station 2 or the core network 3 can compare the dT excess ratio indicated in the report with a predetermined setting change threshold, and change various parameters such as a delay characteristic value and a forwarding path. When the wireless base station 2 or the core network 3 has changed the setting values of the various parameters including the delay characteristic value for the wireless communication device 5, the wireless base station 2 or the core network 3 communicates the changed delay characteristic value dT and the like to the wireless communication device 5.

In FIG. 1, only one wireless base station 2, one MME 31, one S-GW 32, one P-GW 33, and one PCRF 34 are illustrated. However, a plurality of wireless base stations 2, a plurality of MMEs 31, a plurality of S-GWs 32, a plurality of P-GWs 33, and a plurality of PCRFs 34 may exist in the entire network. For example, the PCRF 34 may be arranged for each APN or each telecommunications company. In the core network 3, a data forwarding path is different for each APN. In FIG. 1, each of the solid lines connecting elements in the core network 3 indicates a forwarding path of user data, and each of the dashed lines indicates exchange of control signals.

The core network 3 may also include a Home Location Register (HLR), or a Home Subscriber Server (HSS). The names, combinations, and the like of devices that are components of the core network 3 can be appropriately changed so as to correspond to the communication standard adopted by the mobile communication system 100, such as the 5G standard, for example. The functional configuration in the core network 3 can be changed as appropriate. For example, another device may be provided with the function provided by the PCRF 34. Hereinafter, for example, when respective devices that are components of the core network 3 such as the MME 31 and the S-GW 32 are not distinguished from one another, these devices are also simply referred to as the core network 3. Each of the devices that are components of the core network 3 such as the MME 31 and the S-GW 32 corresponds to the network device. The wireless base station 2 may also be included in the network device. This is because the wireless base station 2 serves as an interface via which the core network 3 communicates with the wireless communication device 5. The description "network device" in the present disclosure may be replaced with "at least one of the wireless base station 2 and the core network 3", in the implementation. The network device can include various equipment via which the wireless communication device 5 communicates with each external device 4.

The automated driving management center 4A is a center that manages an operation state of a vehicle traveling with automated driving. The automated driving management center 4A is configured to be capable of performing data communication with the in-vehicle communication system 1 via the wireless base station 2 or the like. The automated driving management center 4A, for example, receives a traveling condition report uploaded from the in-vehicle communication system 1, and determines the presence or absence of abnormality. The traveling condition report is a data set indicating situations inside a vehicle and outside the vehicle compartment during automated driving. The automated driving management center 4A may be configured to store the traveling condition report transmitted from each vehicle in an operation recording device (not illustrated). In addition, the automated driving management center 4A may have a function of performing remote control based on a request from an automated driving device 6A mounted in a vehicle. The automated driving management center 4A may have a function of creating and distributing a medium- to long-term control plan of a vehicle, such as calculation of a traveling route of the vehicle.

The map server 4B is a server that distributes map data stored in a predetermined database based on a request from a vehicle. The map server 4B is configured to be capable of performing data communication with the in-vehicle communication system 1 via the wireless base station 2 or the like. The map data distributed by the map server 4B may be high-accuracy map data or navigation map data. The high-accuracy map data corresponds to map data indicating a road structure, location coordinates of a feature arranged along a road, and the like, with accuracy available for automated driving. The navigation map data is map data for navigation, and corresponds to map data with accuracy relatively lower than the accuracy of the high-accuracy map data.

<Configuration of In-Vehicle Communication System 1>

The in-vehicle communication system 1 includes, for example, the wireless communication device 5, the automated driving device 6A, a navigation device 6B, and a probe device 6C. Various in-vehicle devices 6 such as the automated driving device 6A, the navigation device 6B, and the probe device 6C are connected to the wireless communication device 5 via an in-vehicle network Nw, which is a communication network built in a vehicle. Devices connected to the in-vehicle network Nw can mutually communicate with each other. That is, the wireless communication device 5 is configured to be capable of mutually communicating with each of the automated driving device 6A, the navigation device 6B, and the probe device 6C. The in-vehicle network Nw is configured to be capable of performing multiplex communication by using a time division scheme, that is, Time Division Multiple Access (TDMA), or the like. For the multiplex communication scheme, a frequency division scheme, that is, Frequency Division Multiple Access (FDMA), a code division scheme, that is, Code Division Multiple Access (CDMA), an Orthogonal Frequency Division Multiplexing (OFDM) scheme, or the like can be adopted.

Figure 2:
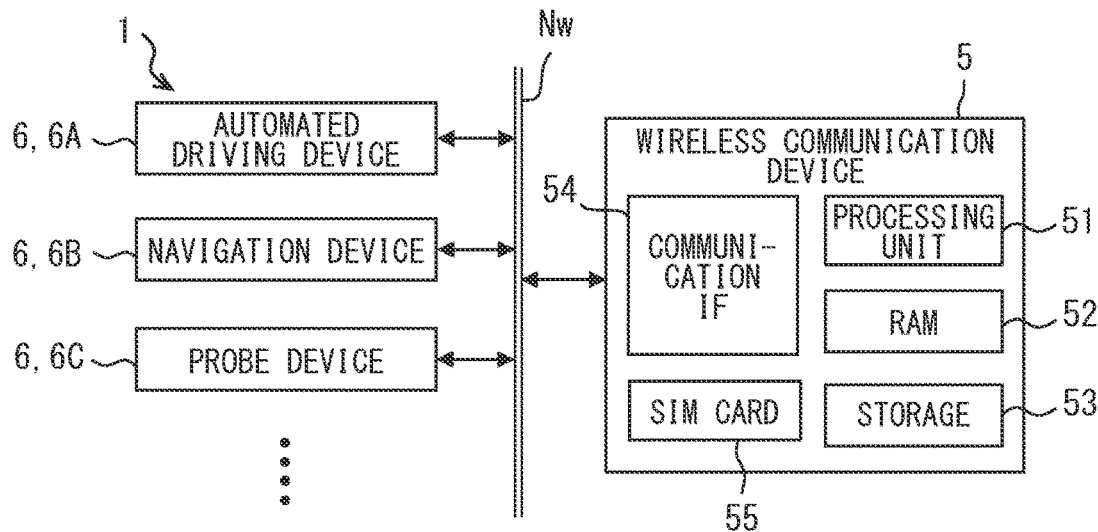
FIG. 2 is a diagram illustrating an example of a configuration of an in-vehicle communication system.

Specific devices may be configured to be capable of performing direct communication with each other without the in-vehicle network Nw interposed therebetween. In FIG. 2, the in-vehicle network Nw is configured as a bus type network. However, the configuration is not limited to this. The network topology may be, for example, a mesh, star, or ring network topology. For a standard of the in-vehicle network Nw, various standards such as a Controller Area Network (CAN, which is a registered trademark), an Ethernet (registered trademark), and a FlexRay (registered trademark) can be adopted. A connection mode between the wireless communication device 5 and each in-vehicle device 6 is not limited to wired connection, and may be wireless connection. Each in-vehicle device 6 may be an electronic control unit (ECU).

The wireless communication device 5 is configured to be capable of performing wireless communication with a plurality of external devices 4, by using a plurality of respective wireless communication services corresponding to a plurality of APNs. The wireless communication device 5 selectively uses the respective wireless communication services corresponding to the APNs based on a communication use or a communication status. The wireless communication device 5 corresponds to an interface configured to allow each in-vehicle device 6 to wirelessly communicate with an external device, which serves as a predetermined communication target. The wireless communication device 5 serving as the wireless communication interface corresponds to a device that executes at least one of processing of transmitting data input from the in-vehicle device 6 to the external device 4 and processing of transmitting data received from the external device 4 to the in-vehicle device 6. With mounting of the wireless communication device 5, the vehicle serves as a connected car connectable to the Internet.

The wireless communication device 5 mainly includes a computer including a processing unit 51, a random access memory (RAM) 52, a storage 53, a communication interface 54, a SIM card 55, and a bus connecting these components. The processing unit 51 is hardware for arithmetic processing, coupled to the RAM 52. The processing unit 51 includes at least one arithmetic core such as a central processing unit (CPU). The processing unit 51 executes various processing by accessing the RAM 52.

The storage 53 includes a non-volatile storage medium such as a flash memory. The storage 53 stores a communication control program, which serves as a program executed by the processing unit 51. Execution of the above program by the processing unit 51 corresponds to execution of a communication control method, which is a method corresponding to the communication control program. Information (for example, profiles or the like) regarding a plurality of APNs to which the wireless communication device 5 is connectable is registered in the storage. The information regarding the APN includes information necessary for the wireless communication device 5 to perform data communication by using a telephone line. For example, the information regarding the APN includes information designating a gateway (that is, a connection destination) serving as a point of connection from the telephone line to a network such as the Internet. The communication interface 54 is a circuit used for communicating with each in-vehicle device 6 via the in-vehicle network Nw. The communication interface 54 may be implemented by using an analog circuit element, an integrated circuit (IC), or the like.

The SIM card 55 is a contact IC card in which information for identifying a subscriber of a line is recorded. SIM stands for Subscriber Identity Module. For example, a unique number called an International Mobile Subscriber Identity (IMSI) is recorded in the SIM card in association with the telephone number of a subscriber. The SIM card 55 is a SIM available to a plurality of APNs. For example, the SIM card 55 may be a SIM covered by the contract with a carrier providing a plurality of APNs. The SIM card 55 may be a SIM inserted into a card slot (not illustrated), or may be an embedded SIM (eSIM). The concept of the SIM card 55 here also includes an eSIM. The wireless communication device 5 may be configured to be connectable to a plurality of APNs by including a plurality of SIM cards.

The automated driving device 6A is a device that performs a part or all of the driving operation on behalf of a user by controlling traveling actuators based on a detection result or the like of a surrounding monitoring sensor such as an in-vehicle camera or a millimeter-wave radar. For the traveling actuators, for example, a brake actuator as a braking device, an electronic throttle, and a steering actuator are included. The steering actuator includes an electric power steering (EPS) motor. The surrounding monitoring sensor is a sensor that detects an object or the like existing around the host vehicle. For the surrounding monitoring sensor, for example, a camera, a millimeter-wave radar, light detection and ranging or laser imaging detection and ranging (Li-DAR), a sonar, or the like can be adopted.

The automated driving device 6A sequentially transmits a data set indicating situations inside a vehicle and outside the vehicle compartment during automated driving to the automated driving management center 4A via the wireless communication device 5, as a traveling condition report. The situation inside a vehicle during automated driving can include the operation state of the automated driving device 6A and the state of an occupant. The data indicating the operation state of the automated driving device 6A includes a recognition result of the surrounding environment recognized in the automated driving device 6A, a traveling plan, and a calculation result of a target control amount or the like of each traveling actuator. The automated driving device 6A sequentially outputs the various data related to automated driving, described above, to the wireless communication device 5.

The automated driving device 6A may be configured to receive control assistance information from the automated driving management center 4A via wireless communication. The control assistance information is, for example, real-time information that serves as reference for creating a control plan. More specifically, the control assistance information may be, for example, information indicating a current location, a movement speed, a traveling direction, and the like of another mobile body existing around a vehicle. The control assistance information may include information on a quasi-dynamic map element such as, for example, a section with traffic regulation, an end position of traffic congestion, or a position of road debris. In this case, the wireless communication device 5 serves as a role that receives data serving as the control assistance information from the automated driving management center 4A, and that outputs the data to the automated driving device 6A. The data set serving as the control assistance information corresponds to an example of data for vehicle control. The automated driving device 6A corresponds to a vehicle control device.

The vehicle may be configured to be remotely operated by an operator present in the automated driving management center 4A, for example, based on difficulty in continuing automated driving in the autonomous system. When the vehicle is remotely operated, the wireless communication device 5 promptly receives a remote control signal transmitted from the automated driving management center 4A. Then, the wireless communication device 5 outputs the remote control signal to the automated driving device 6A or a traveling actuator to be controlled. The data for vehicle control includes the remote control signal transmitted from the automated driving management center 4A or a response signal responding to the control signal.

The navigation device 6B is one of the in-vehicle devices 6, and cooperates with a Human Machine Interface (HMI) system including a display and provides route guidance to a destination set by an occupant. The navigation device 6B executes route guidance processing by using, for example, a map downloaded from the map server 4B. The wireless communication device 5 downloads map data corresponding to the current location and the planned traveling route of a vehicle from the map server 4B based on a request from the navigation device 6B. Then, the wireless communication device 5 provides the map data to the navigation device 6B.

The probe device 6C is a device that generates probe data, with which the map server 4B generates and updates the map data, based on the detection result of the surrounding monitoring sensor, and that uploads the probe data to the map server 4B via the wireless communication device 5. The probe device 6C sequentially transmits a data set indicating, for example, the observed location of a feature identified by the surrounding monitoring sensor to the map server 4B, as probe data. The probe data corresponds to data obtained by packaging recognition results within a certain time period (for example, 400 milliseconds) with respect to a lane line, a landmark, or the like. The probe data may include, for example, transmission-source information, traveling trajectory information, traveling road information, and feature information. The traveling trajectory information is information indicating a trajectory on which the host vehicle has traveled. The feature information indicates observation coordinates of a feature such as a lane line or a landmark. The probe data may also include vehicle behavior information such as a vehicle speed, a steering angle, a yaw rate, blinker operation information, or wiper operation information.

The devices corresponding to the in-vehicle devices 6 are not limited to those illustrated above. Various devices can be directly or indirectly connected to the wireless communication device 5, as the in-vehicle devices 6. Examples of the in-vehicle device 6 can include a driving assistance device, a driving recorder, an emergency reporting device, and a self-diagnostic device, that is, so-called On Board Diagnostics (OBD). As another example of the in-vehicle device 6, a software update device may be included, which wirelessly communicates with a predetermined software update server to acquire a program for updating software of a predetermined ECU. The software update device uses the program to perform software update for the ECU to which the program is applied. Various in-vehicle devices 6 and the wireless communication device 5 transmit and receive various data through multiplexing of the various data using a predetermined scheme.

<Functions of Wireless Communication Device 5>

Figure 3:
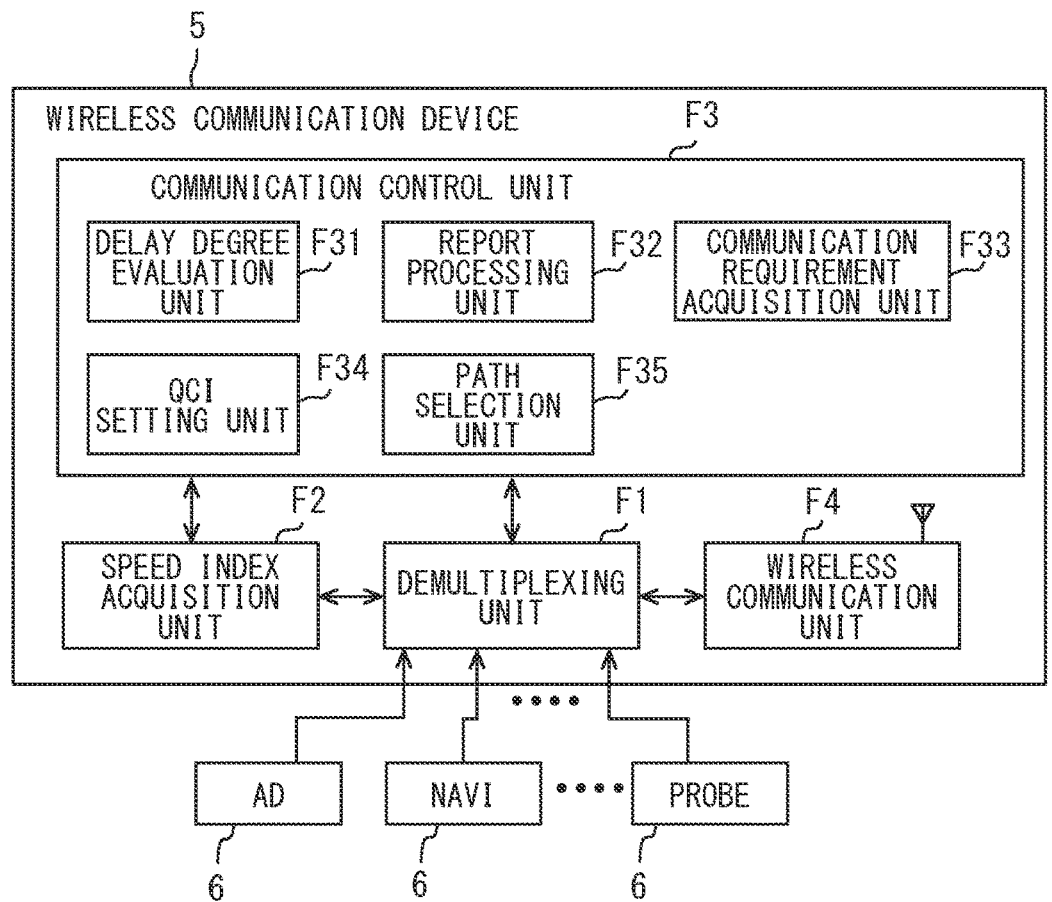
FIG. 3 is a block diagram illustrating a configuration of a wireless communication device.

Functions and operation of the wireless communication device 5 will be described here. The wireless communication device 5 provides functions corresponding to the various functional blocks illustrated in FIG. 3 by executing a communication control program stored in the storage 53. That is, the wireless communication device 5 includes a demultiplexing unit F1, a speed index acquisition unit F2, a communication control unit F3, and a wireless communication unit F4, as functional blocks.

The demultiplexing unit F1 is configured to receive data generated by each in-vehicle device 6, and output the data to the wireless communication unit F4. The demultiplexing unit F1 is also configured to output data received by the wireless communication unit F4 to an in-vehicle device 6 to which the data is to be forwarded. For example, the demultiplexing unit F1 acquires original data by using a predetermined scheme to demultiplex data that has been multiplexed and then input from each in-vehicle device 6. The demultiplexing unit F1 includes a buffer, which is a storage area that temporarily retains data input from each in-vehicle device 6 until the data is transmitted to the wireless base station 2. The buffer may be implemented by using a rewritable storage medium such as a RAM. The demultiplexing unit F1 also includes a function of monitoring the amount of data retained in the buffer and information stored in each header of the data.

The data retained in the buffer is retrieved by the wireless communication unit F4, and is transmitted to a destination external device 4 via a wireless communication path that corresponds to the input source of the data (that is, the in-vehicle device 6). The wireless communication path here corresponds to each individual APN. The wireless communication path corresponds to a wireless communication service. The setting of the wireless communication path for each in-vehicle device 6, that is, the allocation state of the APN for each in-vehicle device 6, is controlled by the communication control unit F3. In the present embodiment, the communication paths of data are controlled in units of the in-vehicle devices 6. However, the manner to control the communication paths of data is not limited to this. The wireless communication device 5 may be configured such that the communication paths are switched in units of pieces of application software. A method of allocating the communication path for each in-vehicle device 6 will be described later.

The speed index acquisition unit F2 acquires a delay characteristic value for each APN from a network device, as an index of the communication speed of each wireless communication path. The delay characteristic value for each APN is provided by a network device, such as the PCRF 34 or the wireless base station 2, that corresponds to each APN. The delay characteristic value corresponding to each APN is set by, for example, the PCRF 34 corresponding to each APN, and is communicated via the MME 31 and the wireless base station 2. The delay characteristic value is provided from the core network 3 when communication connection is established. The delay characteristic value can be updated in the core network 3 based on the UL-PDCP delay report transmitted by the wireless communication device 5, as described above. The speed index acquisition unit F2 provides the acquired delay characteristic value to the communication control unit F3. The speed index acquisition unit F2 corresponds to a delay characteristic acquisition unit.

The communication control unit F3 monitors and controls a communication state for each APN. The communication control unit F3 starts a procedure of establishing connection of a communication line (that is, an EPS bearer) for each APN, for example, in response to turning-on of a vehicle power supply. Then, the communication control unit F3 establishes network connection for each APN, that is, PDN connection.

The communication control unit F3 includes a delay degree evaluation unit F31, a report processing unit F32, a communication requirement acquisition unit F33, a QCI setting unit F34, and a path selection unit F35, as subfunctions. The delay degree evaluation unit F31 is configured to calculate a dT excess ratio periodically or at the time of detecting a predetermined trigger, in a state where communication connection for each APN is established. The report processing unit F32 transmits a UL-PDCP delay report, as UL PDCP Packet Delay, that indicates the dT excess ratio calculated by the delay degree evaluation unit F31 to the core network 3. The calculation of the dT excess ratio and the transmission of the UL-PDCP delay report are performed for each APN, that is, for each communication path.

The communication requirement acquisition unit F33 acquires a delay requirement, which is a required quality related to a data transmission delay, from each in-vehicle device 6. The delay requirement is represented by, for example, an allowable delay value, which is a numerical value indicating an allowable delay time that can be allowed by each in-vehicle device 6. The allowable delay value can be, for example, a numerical value indicating a length of time such as 100 milliseconds. A smaller allowable delay value indicates that immediacy is required. The communication requirement acquisition unit F33 corresponds to a delay allowable amount acquisition unit. The allowable delay value corresponds to an allowable delay amount.

The length of an allowable delay time communicated from each in-vehicle device 6 may be expressed by levels. For example, allowable delay levels representing the lengths of the allowable delay may be expressed by using four stages of levels 1 to 4. Also in a case where the length of the allowable delay time is expressed as the level, a level with a smaller number represents a shorter allowable delay time. For example, the level 1 corresponds to a delay requirement in which a delay time is required to be a time shorter than 100 milliseconds. The level 2 corresponds to a delay requirement in which a delay time is required to be a time equal to or shorter than 300 milliseconds. The level 3 corresponds to a delay requirement in which a delay time is required to be a time shorter than 1000 milliseconds. The level 4 corresponds to a delay requirement in which a delay equal to or longer than 1000 milliseconds is allowed.

In addition, the communication requirement acquisition unit F33 acquires parameters, other than the allowable delay value, related to the mode of wireless communication, from each in-vehicle device 6. For example, the communication requirement acquisition unit F33 acquires an upper limit value of an allowable packet error rate, a resource type regarding a bandwidth guarantee, or the like. For example, a type regarding whether the bandwidth is guaranteed is included in the resource type regarding a bandwidth guarantee. The parameters such as the packet error rate and the resource type regarding a bandwidth guarantee may be acquired from the core network 3. The communication requirement acquisition unit F33 may determine the packet error rate and the resource type regarding a bandwidth guarantee, based on the type of data or the like input from each in-vehicle device 6.

The QCI setting unit F34 is configured to set a quality class ID, that is, QoS Class Identifier (QCI) for each wireless communication path. The QCI corresponds to a quality class number. The QCI is set for each APN. The QCI corresponds to a parameter indicating a characteristic of a service required by line connection. The QCI setting unit F34 corresponds to a quality class setting unit. The path selection unit F35 is configured to select a wireless communication path used for data communication for each in-vehicle device 6, by using the delay characteristic value acquired by the speed index acquisition unit F2. The path selection unit F35 corresponds to a communication path selection unit. Details of the operation of the communication control unit F3 will be described later.

The wireless communication unit F4 is, for example, a communication module in charge of the physical layer in the LTE wireless communication protocol. The wireless communication unit F4 is configured by using an antenna and a transceiver. The antenna can transmit and receive radio waves in a frequency band used in the LTE. The transceiver executes signal processing that corresponds to conversion from a baseband signal to a high-frequency signal, and inverse conversion thereof, in accordance with the communication standard of the LTE. A plurality of antennas may be provided for ensuring reception diversity or the like. The wireless communication unit F4 generates a carrier signal corresponding to data input from the demultiplexing unit F1, by executing processing such as coding, modulation, and digital-to-analog conversion on the input data. Then, the wireless communication unit F4 outputs the generated carrier signal to the antenna to radiate the carrier signal as a radio wave. The wireless communication unit F4 also executes predetermined processing such as analog-to-digital conversion processing and demodulation processing on a received signal received with the antenna, to convert the received signal into an information sequence (that is, digital data) represented by a digital value. Then, the wireless communication unit F4 outputs the data corresponding to the received signal to the demultiplexing unit F1.

<Wireless Communication Path Allocation Processing>

Figure 4:
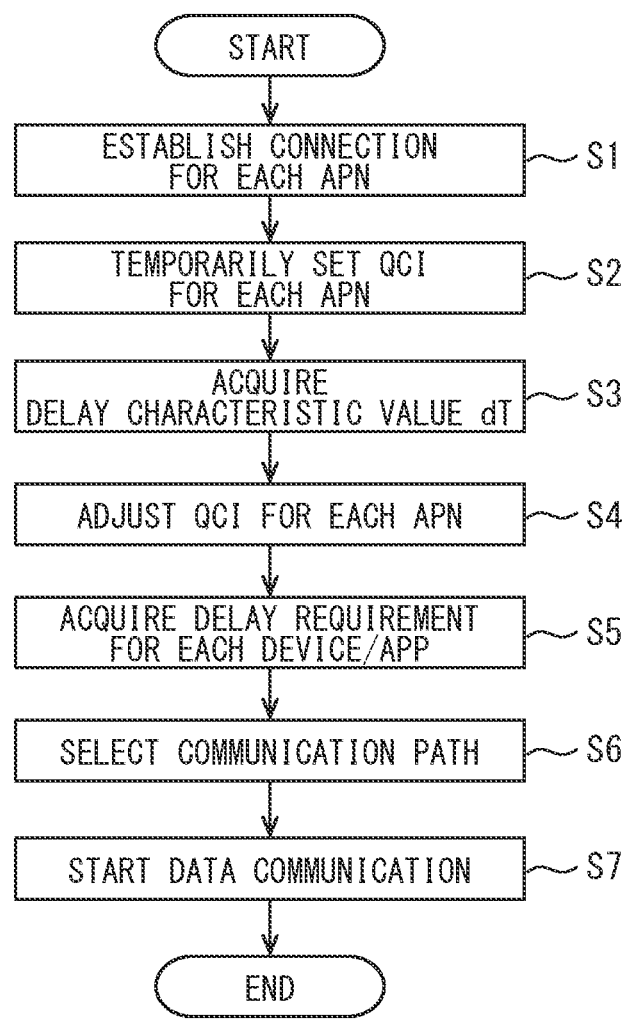
FIG. 4 is a flowchart illustrating a processing flow related to allocation of APNs.

Here, the operation of the wireless communication device 5 will be described with reference to the flowchart illustrated in FIG. 4. The flow of the flowchart illustrated in FIG. 4 is started, for example, by a trigger such as turning-on of a vehicle power supply. The vehicle power supply here may be an accessory power supply or a power supply for traveling. The power supply for traveling is a power supply for traveling of a vehicle, and refers to an ignition power supply when the vehicle is a gasoline-fueled vehicle. When the vehicle is an electrically-powered vehicle such as an electric vehicle or a hybrid vehicle, a system main relay corresponds to the power supply for traveling.

In the following description, a case will be described, as an example, in which the wireless communication device 5 is configured to be capable of using two APNs, that is, APN_1 and APN_2, for ease of description. It is needless to say that the number of APNs available to the wireless communication device 5 may be three or more.

In step S1, the communication control unit F3 executes processing for establishing PDN connection for each APN in cooperation with the wireless communication unit F4 and the like. For example, the communication control unit F3 transmits an attach request including SIM information to the MME 31, for each APN. The PDN connection for each APN is established by communicating each APN based on the request from the MME 31. The MME 31 cooperates with the S-GW and the P-GW to set the PDN connection including a radio bearer, in accordance with each APN communicated from the wireless communication device 5. For the connection setting, reference is made to contract information, that is, charging information, for each user retained by the PCRF 34, and the like. When the PDN connection, that is, the communication path, for each APN is established in step S1, the processing proceeds to step S2.

In step S2, the QCI setting unit F34 temporarily sets respective, different QCI values for APN_1 and APN_2. For convenience, the QCI set for APN_1 is denoted by QCI_1, and the QCI set for APN_2 is denoted by QCI_2. QCI_1 and QCI_2 need to have different values. The temporary setting value of the QCI for each APN may be determined in consideration of an assumed communication use or the like. When the processing in step S2 is completed, the processing proceeds to step S3. Step S2 may be integrated with step S1.

In step S3, the speed index acquisition unit F2 acquires respective delay characteristic values for APN_1 and APN_2 from the core network 3. For convenience, the delay characteristic value corresponding to APN_1 is denoted by dT_1, and the delay characteristic value corresponding to APN_2 is denoted by dT_2. For example, dT_1 can be 120 milliseconds. For example, dT_2 can be 400 milliseconds or the like. These numerical values are examples for explaining the operation of the wireless communication device 5, and can be changed as appropriate. Step S3 corresponds to a delay characteristic acquiring step. When step S3 is completed, the processing proceeds to step S4.

In step S4, the QCI setting unit F34 adjusts the QCI setting value for each APN, based on the delay characteristic value for each APN, which has been acquired in step S3. For example, when the relationship in dT for each APN acquired in step S3 is dT_1<dT_2, and the relationship in the QCI for each APN temporarily set in step S2 is QCI_1>QCI_2, the QCI setting unit F34 changes the QCI for each APN such that the relationship becomes QCI_1<QCI_2. Specifically, the QCI of an APN with a smaller delay characteristic value is caused to be smaller than the QCI of an APN with a larger delay characteristic value. Step S4 corresponds to processing of changing the setting value such that the magnitude relationship in the QCI for each APN matches the magnitude relationship between the delay characteristic values. Step S4 is an optional element, and thus can be omitted.

In step S5, the communication requirement acquisition unit F33 acquires an allowable delay value from each in-vehicle device 6. For convenience, the allowable delay value of the automated driving device 6A is denoted by DA_A, the allowable delay value of the navigation device 6B is denoted by DA_B, and the allowable delay value of the probe device 6C is denoted by DA_C. As an example, the respective allowable delay values as the respective delay requirements from the in-vehicle devices 6 are set to respective values having a relationship of DA_A<DA_B<DA_C. For example, the allowable delay value DA_A of the automated driving device 6A can be set to 100 milliseconds or the like. The allowable delay value DA_B of the navigation device 6B can be set to a value, such as 500 milliseconds, relatively larger than the allowable delay value DA_A of the automated driving device 6A. The allowable delay value DA_C of the probe device 6C can be set to, for example, 2000 milliseconds. The numerical values described above are examples, and can be changed as appropriate.

The delay requirement from each in-vehicle device 6 is input as, for example, a predetermined control signal from each in-vehicle device 6. For example, the delay requirement may be communicated from each in-vehicle device 6 to the wireless communication device 5, at a timing when communication connection is established between each in-vehicle device 6 and the wireless communication device 5 along with turning-on of the vehicle power supply. The delay requirement may be acquired by the processing in which the wireless communication device 5 inquires of each in-vehicle device 6 as to the delay requirement at a predetermined timing or periodically. The delay requirement may be described in a header or the like of data transmitted from each in-vehicle device 6 to the wireless communication device 5. The delay requirement may be set for each application software that is executed by a corresponding one of the in-vehicle devices 6. Step S5 corresponds to an allowable delay amount acquiring step.

Figure 5:
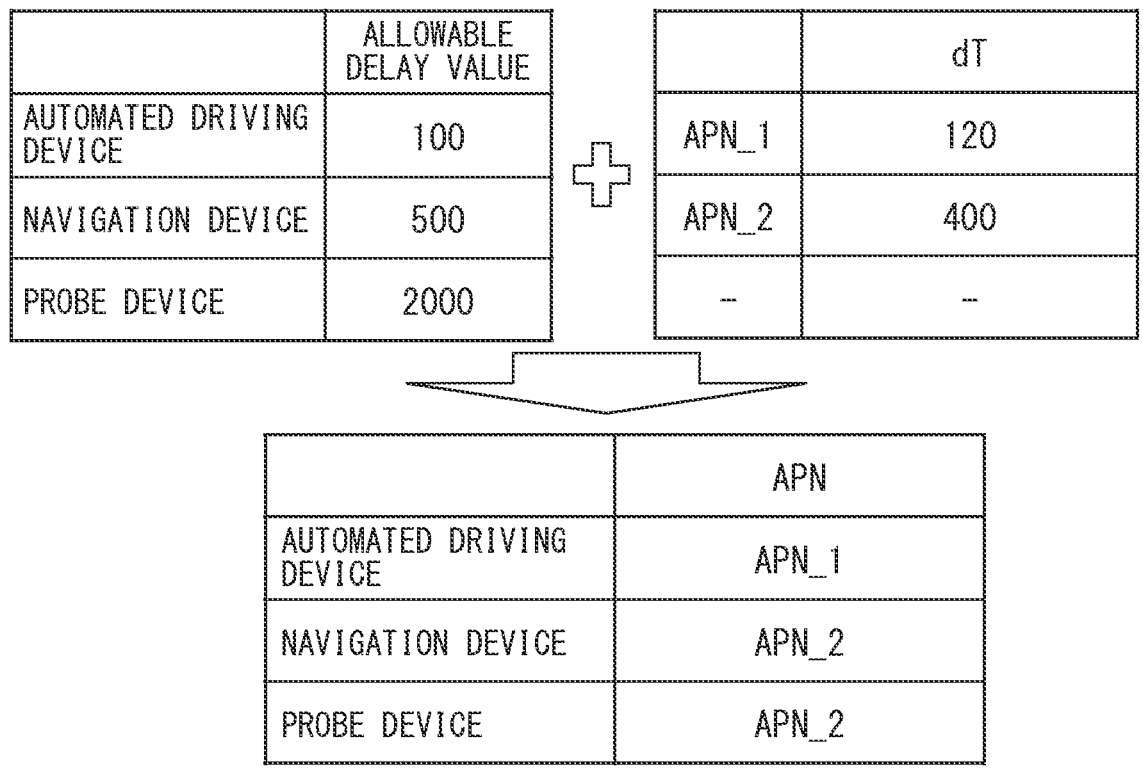
FIG. 5 is a diagram for illustrating operation of a communication control unit.

In step S6, the path selection unit F35 selects a communication path for each in-vehicle device 6. The path selection unit F35 allocates a wireless communication path (that is, an APN), which is relatively small in the delay characteristic value among the wireless communication paths, to an in-vehicle device 6 that is relatively small in the allowable delay value among the in-vehicle devices 6. For example, a wireless communication path corresponding to APN_1 with the smallest delay characteristic value is set for the automated driving device 6A, which has the smallest allowable delay value DA, as illustrated in FIG. 5. A wireless communication path corresponding to APN_2 with a relatively large delay characteristic value is allocated to the navigation device 6B and the probe device 6C, which have relatively large allowable delay values DA. Step S6 corresponds to a communication path selecting step.

In step S7, the communication control unit F3 communicates the wireless communication path (that is, the APN) for each in-vehicle device 6, which has been determined in step S6, to the wireless communication unit F4. Then, the wireless communication path is applied as the communication path for each in-vehicle device 6. As a result, the data input from each in-vehicle device 6 is transmitted via the APN, that is, the communication path, allocated to the input source of the data. A single APN may be allocated to a plurality of in-vehicle devices 6 when the communication speed falls within an allowable range. For example, APN_2 may be allocated to a plurality of in-vehicle devices 6.

The configuration described above corresponds to a configuration in which allocation of the APN for each in-vehicle device 6 is determined in accordance with the delay characteristic value for each APN communicated from each network device, among configurations in each of which a plurality of APNs is used in parallel for the entire vehicle. According to the above configuration, an APN with a smaller delay characteristic value can be allocated to an in-vehicle device 6 that requires communication in which an allowable amount of delay is relatively smaller. As a result, high-urgency data communication can be performed with low delay. A type of data with a short allowable delay time is transmitted via an APN that is relatively small in the delay characteristic value among the APNs. Thus, reduction can be attained for a risk of the occurrence of communication that does not satisfy the required quality related to the delay.

The high-urgency data communication includes data communication whose immediacy (so-called real-time nature) is high. The high-urgency data communication is, for example, data communication in which the maximum delay time is required to be a time equal to or shorter than 100 milliseconds. Specifically, data communication corresponding to the high-urgency data communication includes data communication for vehicle control related to automated driving and driving assistance, data communication related to operation management of an automated driving vehicle, and data communication for remote operation of a vehicle. That is, data input from the automated driving device 6A or the driving assistance device corresponds to data for which communication delay is highly required to be reduced. The in-vehicle device 6, such as the automated driving device 6A or the driving assistance device, that performs vehicle control based on a signal from each external device 4 corresponds to the vehicle control device.

Data communication with low urgency, that is, data communication whose immediacy may be relatively low, is communication related to transmission and reception of map data, communication for uploading probe data to the map server 4B, transmission and reception of an update program for software, or the like. Communication for downloading music data can also be said to be data communication with urgency lower than that of data communication for vehicle control, in a configuration where an audio device mounted on a vehicle acquires the music data from a cloud server and reproduces the music data. However, convenience for a user may be impaired if reproduction of music or a moving image stops in the middle of the reproduction, even in data communication related to multimedia such as music data or moving image data. Thus, data communication related to multimedia corresponds to data communication that requires immediacy more than that of communication for transmission and reception of probe data or map data.

As one aspect, the above example corresponds to a configuration in which an APN with the smallest delay characteristic value is allocated to only one in-vehicle device that handles data for vehicle control. The in-vehicle device that handles data for vehicle control is, for example, the automated driving device 6A. Such a configuration corresponds to a configuration in which one or more of a plurality of APNs available to a vehicle are operated as APNs dedicated to data communication for vehicle control. According to this configuration, the delay time of data communication for vehicle control can be further reduced. The communication line for vehicle control is independent of a multimedia communication line. Thus, reduction can be attained for a risk of delay in data communication for vehicle control.

As an example, scoring may be made with combination of four parameters: a number of multipaths, a degree of interference, an amount of Doppler shift, and an estimation value of an effective throughput. Then, a medium with which a vehicle communicates with an external device may be selected by the scoring. That is, a computational load for score calculation is applied to a processor, in this example. In contrast, according to the configuration of the present disclosure, the wireless communication path for each in-vehicle device 6 is set in accordance with the delay characteristic value. According to the configuration of the present disclosure, an effect of reducing a computational load can therefore be also expected, as compared to the above example. A communication path can also be allocated in accordance with the delay requirement from each in-vehicle device 6. Then, the allocation of the communication path in accordance with the delay requirement from each in-vehicle device 6 can reduce the total value of each delay time exceeding the allowable range for each in-vehicle device 6, as the entire system including the plurality of in-vehicle devices 6. That is, communication efficiency can be optimized for the entire system.

While the embodiment of the present disclosure has been described above, the present disclosure is not limited to the embodiment described above. Various modifications to be described below are also included in the technical scope of the present disclosure. Besides the modifications to be described below, the present disclosure can be implemented with various changes without departing from the gist of the present disclosure. For example, the various modifications to be described below can be implemented in appropriate combination within a scope that does not cause technical inconsistency. Members having the same functions as those of the members described in the embodiment described above are denoted by the same reference signs, and the description thereof will be omitted. When only a part of the configuration is described, the configuration of the embodiment described above can be applied to other parts.

Figures 6, 7, 8:
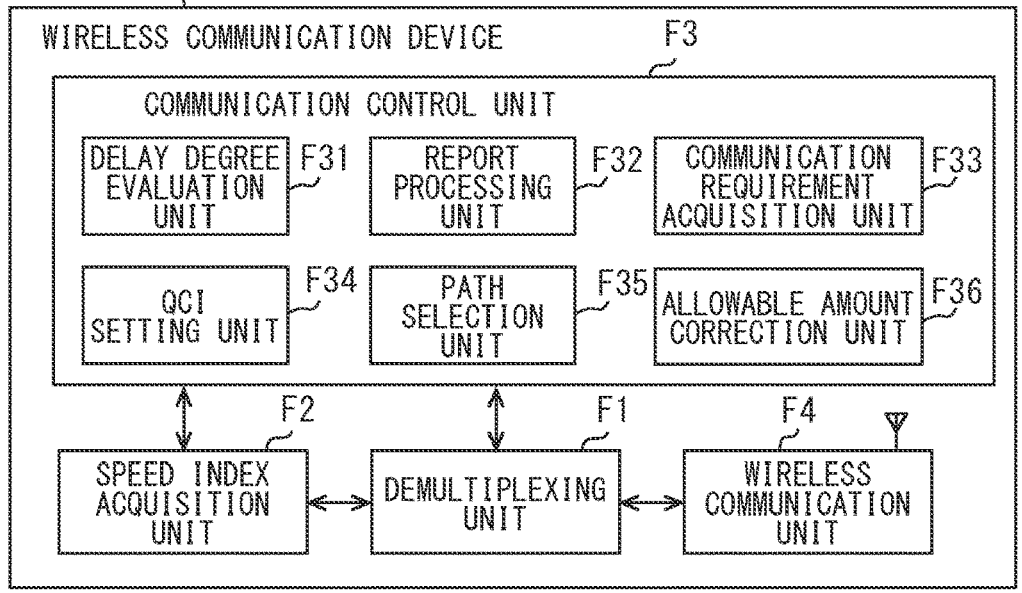
FIG. 6 is a block diagram illustrating a modification of the wireless communication device.
FIG. 7 is a diagram for illustrating a configuration in which operation is performed by correcting an allowable delay amount communicated from an in-vehicle device.
FIG. 8 is a diagram for illustrating an effect brought by the configuration in which the operation is performed by correcting an allowable delay amount communicated from the in-vehicle device.

A mode has been disclosed in which the path selection unit F35 described above allocates the APNs and the communication paths by directly comparing the allowable delay values communicated from the respective in-vehicle devices 6. However, a manner of the allocation is not limited to this. The path selection unit F35 may be configured to allocate an APN using a value obtained by adding or subtracting a predetermined offset value to and from an allowable delay value, which is communicated from the in-vehicle device 6 as an allowable delay value of the specific in-vehicle device 6 under a predetermined condition. Accordingly, as illustrated in FIG. 6, the communication control unit F3 may include an allowable amount correction unit F36, which applies an offset to the allowable delay value acquired from the in-vehicle device 6. Application of the offset to the allowable delay value acquired from the in-vehicle device 6 corresponds to a correction of the allowable delay value acquired from the in-vehicle device 6.

FIG. 7 illustrates an example in which an offset value of −40 milliseconds is set for the driving assistance device, which serves as the in-vehicle device 6. In this case, the allowable amount correction unit F36 communicates a value of 110, which is a value obtained by subtracting 40 from 150, to the path selection unit F35, as the allowable delay value of the driving assistance device. The path selection unit F35 executes allocation processing of the communication path by using the corrected allowable value, which is the value corrected by the allowable amount correction unit F36, as the allowable delay value of the driving assistance device. Specifically, the path selection unit F35 compares the corrected allowable value to an allowable delay value of another in-vehicle device 6. Then, the path selection unit F35 allocates APNs such that an APN that is relatively small in the delay characteristic value is allocated to an in-vehicle device 6 that is relatively small in the allowable value among the in-vehicle devices 6. The corrected allowable value corresponds to a corrected allowable amount.

The offset value for each in-vehicle device 6 with respect to the allowable delay value is preferably determined based on a packet error rate allowed by each in-vehicle device 6, a resource type regarding a bandwidth guarantee, or the like. A higher allowable packet error rate means that a substantial communication speed may be slower. In contrast, a lower packet error rate means that a higher communication speed is required. Thus, a subtraction amount, as an offset, is set to be large, in order to allocate an APN with a smaller delay characteristic value to an in-vehicle device 6 with a lower allowable packet error rate. An in-vehicle device 6 that requires a bandwidth guarantee corresponds to an in-vehicle device 6 that requires a substantially high communication speed. Thus, an offset value with a larger subtraction amount is set for the in-vehicle device 6 that requires the bandwidth guarantee, in order to allocate an APN with a smaller delay characteristic value to this in-vehicle device 6. An offset amount in accordance with the packet error rate and the resource type regarding a bandwidth guarantee may be determined based on a map or a table prepared in advance.

According to the above configuration, a communication path is set in consideration of the allowable packet error rate or the like, in addition to an allowable delay value communicated from a network device. Thus, a more appropriate combination in accordance with the use or the like can be attained for the respective communication paths of the in-vehicle devices 6. Further, there may be a case in which there is a plurality of in-vehicle devices 6 with the same level of allowable delay values, and in which there is a deviation in effective communication speed between the in-vehicle devices 6 caused by a difference in the APNs. In this case, the deviation can be reduced. Here, the same level is not limited to exactly the same level. For example, the in-vehicle devices 6 with the same level of allowable delay values can include in-vehicle devices 6 with allowable delay values whose difference is, for example, equal to or shorter than 50 milliseconds.

The offset value with respect to the allowable delay amount may be determined, based on the observation value of an actual packet error rate or a dT excess ratio, for each wireless communication service. For example, a value obtained by subtracting a predetermined offset value from an allowable delay value may be used as an allowable delay value for setting a communication path, for an in-vehicle device 6 receiving allocation of an APN in which the observation value of the packet error rate is equal to or higher than a predetermined threshold. An allocation state can be changed to a state with a communication path in which a real-time nature required by an in-vehicle device 6 can be attained, by correcting an allowable delay value communicated from the in-vehicle device 6 in consideration of an actual communication status.

For example, when the observation value of a packet error rate calculated by the delay degree evaluation unit F31 cannot satisfy the required delay from the driving assistance device, the allowable amount correction unit F36 applies an offset to the allowable delay amount of the driving assistance device. As a result, when a change occurs in the magnitude relationship or the priority order between the respective allowable delay values of the driving assistance device and another in-vehicle device 6, the APN of the driving assistance device can be changed. For example, an offset is applied to the allowable delay value of the driving assistance device, in accordance with the packet error rate. As illustrated in FIG. 8, this application of the offset allows the APN allocated to the driving assistance device to change from APN_2, currently allocated, to an APN, such as APN_1, with a relatively smaller delay characteristic value. APN_3 illustrated in FIG. 8 is a third APN available to the wireless communication device 5. APN_3 is, for example, an APN whose delay characteristic value is larger than the delay characteristic value of APN_2.

The above description has illustrated a case in which operation is performed by correcting an allowable delay amount using a packet error rate. However, similar operation can be performed using a dT excess ratio. According to this configuration, allocation of the communication path for each in-vehicle device 6 can be attained so as to correspond to the actual communication speeds.

Figures 9, 10, 11:
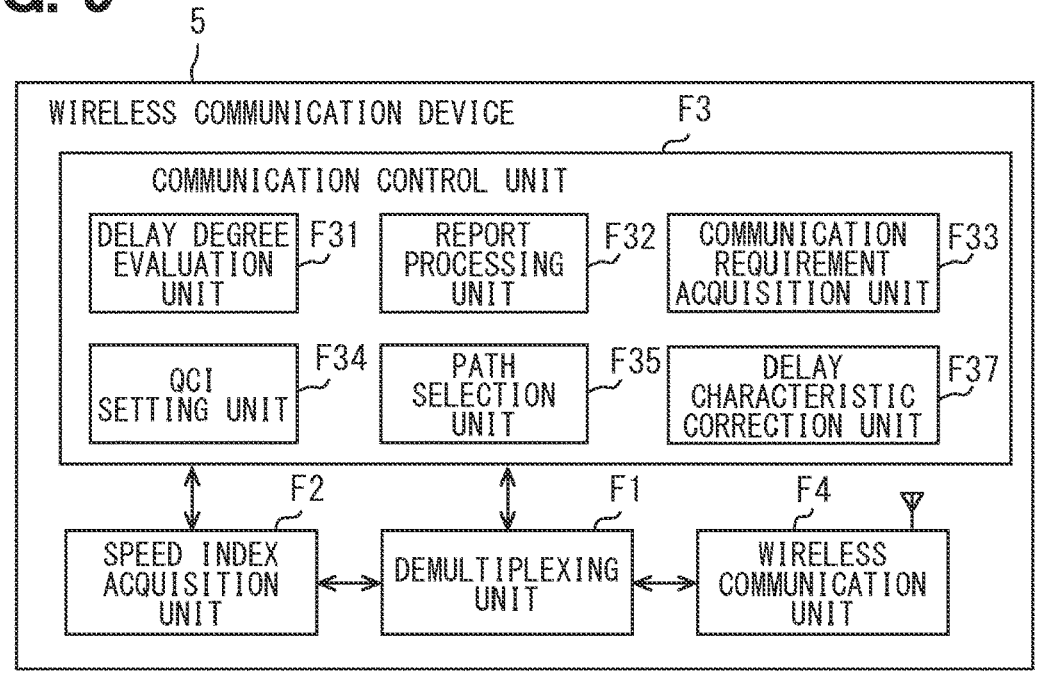
FIG. 9 is a block diagram illustrating another modification of the wireless communication device.
FIG. 10 is a diagram for illustrating a configuration in which operation is performed by correcting delay characteristic values communicated from a core network.
FIG. 11 is a diagram illustrating a mode in which APNs are allocated on an application-by-application basis.

As illustrated in FIG. 9, the communication control unit F3 may include a delay characteristic correction unit F37, which corrects the delay characteristic value for each APN, based on the dT excess ratio for each APN calculated by the delay degree evaluation unit F31. For example, the delay characteristic correction unit F37 applies an offset to the delay characteristic value of an APN whose dT excess ratio is higher than a predetermined threshold. Application of the offset to the delay characteristic value communicated from a network device corresponds to a correction of the delay characteristic value communicated from the network device. That is, this configuration corresponds to a configuration in which the delay characteristic value communicated from a network device is corrected based on the evaluation result generated by the delay degree evaluation unit F31. The threshold for the dT excess ratio for applying the offset may be 20%, 40%, or the like.

There may also be a plurality of thresholds. The offset to be added may be increased with an increase in the dT excess ratio. For example, as illustrated in FIG. 10, when the dT excess ratio of APN_2 is 25% and exceeds 20% that is a predetermined first threshold, a value of 30 is added as an offset. When the dT excess ratio of APN_4 is 50% and exceeds 40% that is a predetermined second threshold, a value of 100 is added as an offset. Such a configuration corresponds to a configuration in which the communication speed of the APN is regarded as being slower than a speed estimated based on the delay characteristic value acquired from a network device, depending on an actually observed dT excess ratio.

The path selection unit F35 in the above configuration executes allocation processing of the communication path by using the corrected delay characteristic value, which is the value corrected by the delay characteristic correction unit F37, as the delay characteristic value for each APN. Specifically, the path selection unit F35 allocates an APN, which is relatively small in the corrected delay characteristic value among the APNs, to an in-vehicle device 6 that is smaller in the allowable delay value among the in-vehicle devices 6. The corrected delay characteristic value here also includes a delay characteristic value whose correction amount is zero. According to this configuration, the communication speed for each APN estimated by the wireless communication device 5 can be caused to approximate a value corresponding to an actual communication speed. Thus, the APN for each in-vehicle device 6 can be more appropriately allocated. As a result, reduction can further be attained for a risk of the occurrence of communication that does not satisfy the requirement related to delay time.

When the dT excess ratio of a certain APN is higher than a predetermined threshold, the configuration may be made such that another APN or other APNs are allocated to a part or all of the in-vehicle devices 6 to which this certain APN is allocated. Such a configuration corresponds to a configuration in which another wireless communication service is allocated to an in-vehicle device 6 that receives allocation of a wireless communication service whose degree of delay, evaluated by the delay degree evaluation unit F31, is equal to or larger than a predetermined threshold. According to this configuration, reduction can further be attained in the number of in-vehicle devices 6 each of which uses a wireless communication service in which the dT excess ratio is higher than a predetermined value. As a result, reduction can further be attained for a risk of the occurrence of communication that does not satisfy the requirement related to delay time.

When an APN allocated to a certain in-vehicle device 6 is changed, communication can be momentarily interrupted. This is because when the APN is changed to a new APN, a communication path using the new APN is searched for and is set, from the in-vehicle device 6 to an external device 4. The reset of the communication path is implemented by the core network 3 (mainly, the MME) exchanging control signals with the wireless communication device. Specifically, an IP address and a port number, applied to the data communication, are changed with the path selection. Thus, the network side and the wireless communication device 5 exchange the control signals for matching the communication settings such as the IP address and the like. In view of this problem, a suspension is preferably made for the execution of the path change processing, which is processing of changing the allocation of APNs to the vehicle control device such as the automated driving device 6A, while high-urgency data communication is performed or while the vehicle is traveling. That is, the path change processing is preferably executed on the condition such as a timing at which the communication for high-urgency data is completed or at a timing when the vehicle is stopped. For example, the path change processing for the automated driving device 6A may be executed at a timing when data communication is not performed between the automated driving device 6A and the automated driving management center 4A. According to this configuration, reduction can be attained for a risk of temporary interruption of high-urgency data communication while the communication is performed. The path change processing for the automated driving device 6A may be executed based on the satisfaction of a predetermined path change condition. The predetermined path change condition includes, for example, a case in which the dT excess ratio or the packet error rate of the APN allocated to the automated driving device 6A is equal to or higher than a predetermined threshold.

When the UL-PDCP delay report indicating that the dT excess ratio is equal to or higher than the predetermined setting change threshold is transmitted to the core network 3, the core network 3 may change the data path in the core network 3 based on the report. When the path setting in the core network 3 is changed, the data communication may be temporarily interrupted until the reset of a routing table is completed. Thus, the transmission of the UL-PDCP delay report for the APN allocated to the automated driving device 6A may be performed on either one of the following conditions, or the like. That is, the transmission is performed when data communication is not performed between the automated driving device 6A and the automated driving management center 4A, or when the vehicle is stopped. According to this configuration, reduction can be attained for a risk of interruption of high-urgency data communication.

<Other Modifications>

In the above description, the communication paths of data are controlled in units of the in-vehicle devices 6. However, the manner to control the communication paths of data is not limited to this. The wireless communication device 5 may be configured such that the communication paths are switched in units of applications. In addition, for example, as illustrated in FIG. 11, when a single in-vehicle device 6 executes a plurality of applications, a plurality of APNs corresponding to respective applications may be allocated to the single in-vehicle device 6. An APN may be set for each in-vehicle device 6 and for each application. The devices A to C illustrated in FIG. 11 can be, for example, the automated driving device 6A, the navigation device 6B, and the probe device 6C in this order. An application A-1 can be, for example, an application for acquiring traveling assistance information and creating a control plan. An application A-2 can be, for example, an application for uploading data, indicating the operation state of the automated driving device 6A, that is locally stored in a vehicle, to the automated driving management center 4A. An application B-1 can be, for example, a navigation application. An application C-1 can be an application for generating probe data and uploading the probe data to the map server 4B.

Each of the applications here refers to application software. A plurality of applications may be allocated to a single APN. The description of "for each in-vehicle device 6" in the present disclosure can be replaced with "for each application", in the implementation. A technical idea in which a wireless communication service is allocated for each in-vehicle device 6 also includes a configuration in which a wireless communication service is allocated for each application.

An example has been described above, in which the delay requirement from each in-vehicle device is expressed with a parameter, such as allowable delay value, where the parameter indicates that the requirement for immediacy is increased along with a reduction in the numerical value of the parameter. However, the parameter is not limited to this. The delay requirement may be expressed with a parameter indicating that the requirement for immediacy is increased along with an increase in the numerical value of the parameter. The delay requirement may be expressed with immediacy levels indicating degrees of the requirement for immediacy. A higher immediacy level indicates that a shorter delay time is required.

The wireless communication device 5 may output a predetermined error signal to the automated driving device 6A, when the wireless communication device 5 selects any available APN as the APN for the automated driving device, but the communication speed cannot be obtained to the extent that the automated driving device 6A requires. The error signal can be a signal indicating that the required communication speed, that is, the real-time nature of communication cannot be secured. According to this configuration, the automated driving device 6A may perform vehicle control for safety, based on the reception of the error signal from the wireless communication device 5. The vehicle control for safety here is, for example, control for reducing the traveling speed of the vehicle, or control for transferring the authority to the occupant on the driver seat.

The wireless communication device 5 may sequentially output a communication speed report signal indicating a communication status between the automated driving device 6A and the automated driving management center 4A as the external device 4, to the automated driving device 6A. The communication speed report signal can be a signal directly or indirectly indicating a degree of delay in communication, such as an average value of delay times, a packet error rate, a delay characteristic value, or a dT excess ratio. The communication speed here may be only the upstream communication speed or only the downstream communication speed. According to this configuration, the automated driving device 6A can change the behavior (that is, the system response) of a vehicle, based on the communication speed report signal from the wireless communication device 5. For example, the automated driving device 6A may perform vehicle control for safety, based on a slow communication speed for communicating with the external device 4. The vehicle control for safety here is, for example, control for reducing the traveling speed of the vehicle, or control for transferring the authority to the occupant on the driver seat.

The wireless communication device 5 may be configured to save data indicating a communication status, as a communication log, in a recording device (not illustrated), for example. According to this configuration, a communication status during automated driving can be recorded. Data indicating the occurrence of a communication error can also be preserved. The above data can be used, for example, for analyzing a cause in a case where an accident occurs during automated driving. Preservation of a communication status with an external device during automated driving as a log facilitates an analysis on a cause in a case where an accident occurs.

The wireless communication device 5 described above is suitable for a vehicle that is designed according to an operational design domain (ODD). The ODD includes a condition that is satisfied when a delay time in communication with the automated driving management center 4A is shorter than a predetermined threshold. According to the wireless communication device 5 described above, reduction can be attained for a risk of falling outside a predetermined allowable time period in data communication related to automated driving. As one mode, the wireless communication device 5 described above sequentially communicates information indicating a degree of delay in communication with the automated driving management center 4A to the automated driving device 6A. Thus, the automated driving device 6A can change the system response in accordance with the communication status communicated from the wireless communication device 5. As a result, reduction can be attained for a risk of continuing automated driving even in a condition where the ODD is not satisfied from the viewpoint of communication delay. The ODD defines conditions or environments under which automated driving can be performed.

ADDITIONAL REMARKS

Each device and each method thereof described in the present disclosure may be implemented by a dedicated computer including a processor programmed to execute one or more functions embodied by a computer program. Each device and each method thereof described in the present disclosure may also be implemented by using a dedicated hardware logic circuit. Each device and each method thereof described in the present disclosure may further be implemented by one or more dedicated computers configured by a combination of a processor executing a computer program and one or more hardware logic circuits. The computer program may be stored in a computer-readable non-transitory tangible storage medium, as an instruction to be executed by a computer. That is, means and functions provided by the wireless communication device 5 or the like can be provided by software recorded in a tangible memory device and a computer that executes the software, only software, only hardware, or a combination thereof. For example, part or all of the functions included in the wireless communication device 5 may be implemented as hardware. A mode in which a certain function is implemented as hardware includes a mode in which the function is implemented by using one or more ICs or the like. The wireless communication device 5 may be implemented by using a micro processing unit (MPU), a graphics processing unit (GPU), or a data flow processor (DFP), instead of the CPU. The wireless communication device 5 may be implemented by combining multiple types of arithmetic processing units such as a CPU, an MPU, and a GPU. The wireless communication device 5 may be implemented as a system-on-chip (SoC). Each of the various processing units or processing sections may be implemented by using a field-programmable gate array (FPGA) or an application specific integrated circuit (ASIC). The various programs may be stored in a non-transitory tangible storage medium. For storage media of the programs, various storage media can be adopted such as a hard-disk drive (HDD), a solid state drive (SSD), an erasable programmable read-only memory (EPROM), and an SD card.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle wireless communication device used as an interface for communication between at least one in-vehicle device of a vehicle and an external device that is another communication device placed outside the vehicle, the vehicle wireless communication device being configured to use wireless communication services, the vehicle wireless communication device comprising:
   a delay characteristic acquisition unit configured to acquire a delay characteristic value for each of the wireless communication services from a network device, the network device being a component of a wireless communication network, the delay characteristic value being an upper limit of an estimated range of delay time in communication;
   a delay allowable amount acquisition unit configured to acquire an allowable delay amount from the at least one in-vehicle device, the allowable delay amount directly or indirectly indicating a length of an allowable delay time in communication; and
   a communication path selection unit configured to select a wireless communication service from among the wireless communication services for the communication between the at least one in-vehicle device and the external device based on the delay characteristic value of each of the wireless communication services and the allowable delay amount of the at least one in-vehicle device, wherein
   the communication path selection unit is configured to allocate a wireless communication service, which is relatively small in the delay characteristic value among the wireless communication services, to an in-vehicle device that is relatively small in the allowable delay amount among the at least one in-vehicle device.

2. The vehicle wireless communication device according to claim 1, wherein
   the at least one in-vehicle device is at least one of in-vehicle devices,
   the delay allowable amount acquisition unit is configured to acquire the allowable delay amount from each of the in-vehicle devices,
   the communication path selection unit is configured to select a wireless communication service from among the wireless communication services for each of the in-vehicle devices based on the delay characteristic value of each of the wireless communication services and the allowable delay amount of each of the in-vehicle devices, and
   the communication path selection unit is configured to allocate a wireless communication service, which is relatively small in the delay characteristic value among the wireless communication services, to an in-vehicle device that is smaller in the allowable delay amount than another in-vehicle device among the in-vehicle devices.

3. The vehicle wireless communication device according to claim 2, further comprising
a quality class setting unit configured to allocate a different quality class number for each of the wireless communication services, wherein
the quality class setting unit is configured to allocate the different quality class number such that the quality class number becomes smaller as the delay characteristic value becomes smaller.

4. The vehicle wireless communication device according to claim 2, wherein
the delay allowable amount acquisition unit is configured to acquire at least one of a packet error rate or a resource type regarding a bandwidth guarantee from each of the in-vehicle devices, the packet error rate being a packet error rate allowed by the each of the in-vehicle devices, the resource type regarding the bandwidth guarantee being required by the each of the in-vehicle devices,
the vehicle wireless communication device further comprising
an allowable amount correction unit configured to correct the allowable delay amount communicated from each of the in-vehicle devices by a predetermined amount based on at least one of the packet error rate or the resource type regarding the bandwidth guarantee, wherein
the communication path selection unit is configured to allocate the wireless communication services to the respective in-vehicle devices by using a corrected allowable amount that is the allowable delay amount corrected by the allowable amount correction unit.

5. The vehicle wireless communication device according to claim 1, further comprising
a delay degree evaluation unit configured to evaluate a delay degree for each of the wireless communication services, wherein
when one of the wireless communication services is allocated to the at least one in-vehicle device and is larger than or equal to a predetermined threshold in the delay degree evaluated by the delay degree evaluation unit, the communication path selection unit is configured to allocate another of the wireless communication services to the at least one in-vehicle device.

6. The vehicle wireless communication device according to claim 1, further comprising:
a delay degree evaluation unit configured to evaluate a delay degree for each of the wireless communication services; and
a delay characteristic correction unit configured to correct the delay characteristic value of each of the wireless communication services based on an evaluation result of the delay degree evaluation unit, wherein
the wireless communication service is allocated to the at least one in-vehicle device by using a corrected delay characteristic value that is the delay characteristic value corrected by the delay characteristic correction unit.

7. The vehicle wireless communication device according to claim 1, wherein the at least one in-vehicle device includes a vehicle control device configured to communicate data about automated driving or driving assistance to a predetermined external device,
the communication path selection unit is configured to execute path change process that changes a wireless communication service allocated to the vehicle control device when a predetermined path change condition is satisfied, and
the path change process is executed at a timing when data communication between the vehicle control device and the external device is not performed or at a timing when the vehicle is stopped.

8. The vehicle wireless communication device according to claim 1, wherein
the at least one in-vehicle device includes a vehicle control device configured to communicate data about automated driving or driving assistance to the external device,
the vehicle wireless communication device, further comprising:
a delay degree evaluation unit configured to evaluate a delay degree for each of the wireless communication services; and
a report processing unit configured to transmit the delay degree to the network device, wherein
the report processing unit is configured to transmit the delay degree at a timing when data communication of the vehicle control device is not performed or at a timing when the vehicle is stopped.

9. The vehicle wireless communication device according to claim 1, wherein
the at least one in-vehicle device includes a vehicle control device configured to communicate data about automated driving or driving assistance to the external device, and
the vehicle wireless communication device is configured to output a predetermined error signal to the vehicle control device when a delay time of communication in any one of the wireless communication services does not become shorter than or equal to the allowable delay amount required by the vehicle control device.

10. The vehicle wireless communication device according to claim 1, wherein
the vehicle wireless communication device is used for a vehicle that is designed according to an operational design domain, the operational design domain including a condition that is satisfied when a delay time in communication with the external device related to automated driving is shorter than a predetermined threshold,
the at least one in-vehicle device includes a vehicle control device configured to communicate data about automated driving to the external device, and
the vehicle wireless communication device is configured to output delay information to the vehicle control device, the delay information indicating a degree of delay in communication between the vehicle control device and the external device.

11. A communication control method for control of communication between at least one in-vehicle device of a vehicle and an external device that is a communication device placed outside the vehicle, the communication control method using wireless communication services in parallel, the external device being another communication device provided outside a vehicle, the communication control method being executed by at least one processor, the communication control method comprising:

acquiring a delay characteristic value for each of the wireless communication services from a network device, the network device being a component of a wireless communication network, the delay characteristic value being an upper limit of an estimated range of delay time in communication;

acquiring an allowable delay amount from the at least one in-vehicle device, the allowable delay amount directly or indirectly indicating a length of an allowable delay time in communication; and selecting a wireless communication service from among the wireless communication services for the communication between the at least one in-vehicle device and the external device based on the delay characteristic value of each of the wireless communication services and the allowable delay amount of the at least one in-vehicle device, wherein the selecting includes allocating a wireless communication service, which is relatively small in the delay characteristic value among the wireless communication services, to an in-vehicle device that is relatively small in the allowable delay amount among the at least one in-vehicle device.

12. A vehicle wireless communication device used as an interface for communication between at least one in-vehicle device of a vehicle and an external device that is another communication device placed outside the vehicle, the vehicle wireless communication device being configured to use wireless communication services, the vehicle wireless communication device comprising a processor configured to:

acquire a delay characteristic value for each of the wireless communication services from a network device, the network device being a component of a wireless communication network, the delay characteristic value being an upper limit of an estimated range of delay time in communication;

acquire an allowable delay amount from the at least one in-vehicle device, the allowable delay amount directly or indirectly indicating a length of an allowable delay time in communication; and select a wireless communication service from among the wireless communication services for the communication between the at least one in-vehicle device and the external device based on the delay characteristic value of each of the wireless communication services and the allowable delay amount of the at least one in-vehicle device such that a wireless communication service, which is relatively small in the delay characteristic value among the wireless communication services, to an in-vehicle device that is relatively small in the allowable delay amount among the at least one in-vehicle device.

* * * * *